US011263259B2

(12) United States Patent
Shen et al.

(10) Patent No.: US 11,263,259 B2
(45) Date of Patent: *Mar. 1, 2022

(54) COMPOSITING AWARE DIGITAL IMAGE SEARCH

(71) Applicant: Adobe Inc., San Jose, CA (US)

(72) Inventors: Xiaohui Shen, San Jose, CA (US); Zhe Lin, Fremont, CA (US); Kalyan Krishna Sunkavalli, San Jose, CA (US); Hengshuang Zhao, Hong Kong (CN); Brian Lynn Price, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 16/929,429

(22) Filed: Jul. 15, 2020

(65) Prior Publication Data
US 2020/0349189 A1 Nov. 5, 2020

Related U.S. Application Data

(63) Continuation of application No. 15/986,401, filed on May 22, 2018, now Pat. No. 10,747,811.

(51) Int. Cl.
G06F 16/00 (2019.01)
G06F 16/58 (2019.01)
(Continued)

(52) U.S. Cl.
CPC .......... G06F 16/5866 (2019.01); G06F 16/51 (2019.01); G06N 3/08 (2013.01)

(58) Field of Classification Search
CPC ...... G06F 16/5866; G06F 16/51; G06F 16/58; G06N 3/08; G06N 3/0454; G06N 20/00; G06T 7/10
See application file for complete search history.

(56) References Cited

U.S. PATENT DOCUMENTS 10,747,811 B2    8/2020   Shen et al.
2015/0043810 A1* 2/2015   Deng ................ G06T 7/0002
                                              382/159
(Continued)

OTHER PUBLICATIONS

Okawa, "Synergy of foreground-background images for feature extraction", Elsevier Ltd, 0031-3203, pp. 480-489 (Year: 2018).*

(Continued)

Primary Examiner — Alexander Khong
(74) Attorney, Agent, or Firm — FIG. 1 Patents

(57) ABSTRACT

Compositing aware digital image search techniques and systems are described that leverage machine learning. In one example, a compositing aware image search system employs a two-stream convolutional neural network (CNN) to jointly learn feature embeddings from foreground digital images that capture a foreground object and background digital images that capture a background scene. In order to train models of the convolutional neural networks, triplets of training digital images are used. Each triplet may include a positive foreground digital image and a positive background digital image taken from the same digital image. The triplet also contains a negative foreground or background digital image that is dissimilar to the positive foreground or background digital image that is also included as part of the triplet.

20 Claims, 12 Drawing Sheets

(51) Int. Cl.
*G06N 3/08* (2006.01)
*G06F 16/51* (2019.01)

(56) References Cited

U.S. PATENT DOCUMENTS

| | | | |
|---|---|---|---|
| 2017/0132526 A1* | 5/2017 | Cohen | G06N 5/022 |
| 2018/0082410 A1* | 3/2018 | Schulte | G06K 9/42 |
| 2018/0260665 A1* | 9/2018 | Zhang | G06K 9/6276 |
| 2018/0260668 A1* | 9/2018 | Shen | G06T 11/00 |
| 2019/0043403 A1* | 2/2019 | Van Droogenbroeck | G06T 7/194 |
| 2019/0080205 A1* | 3/2019 | Kaufhold | G06N 3/0481 |
| 2019/0271632 A1* | 9/2019 | Yang | G01N 33/96 |
| 2019/0286932 A1* | 9/2019 | Du | G06K 9/2054 |
| 2019/0340469 A1* | 11/2019 | Su | G06K 9/6262 |
| 2019/0361994 A1 | 11/2019 | Shen et al. | |

OTHER PUBLICATIONS

"Combined Search and Examination Report", GB Application No. 1903414.9, dated Sep. 6, 2019, 6 pages.
"Notice of Allowance", U.S. Appl. No. 15/986,401, dated Apr. 8, 2020, 11 pages.
"Pre-Interview First Office Action", U.S. Appl. No. 15/986,401, dated Mar. 16, 2020, 4 pages.
Lalonde, et al., "Photo Clip Art", Computer Graphics Proceedings, Annual Conference, Aug. 2007, pp. 1-10.
Okawa, Manabu, "Synergy of foreground-background images for feature extraction: Offline signature verification using Fisher vector with fused KAZE features", Feb. 2018, pp. 480-489.
Tan, Fuwen et al., "Where and Who? Automatic Semantic-Aware Person Composition", Dec. 2, 2017, 10 pages.
Zhu, Jun-Yan, "Learning a Discriminative Model for the Perception of Realism in Composite Images", Computer Vision and Pattern Recognition, Oct. 2015, 9 pages.

* cited by examiner

COMPOSITING AWARE DIGITAL IMAGE SEARCH

RELATED APPLICATIONS

This application claims priority as a continuation of U.S. patent application Ser. No. 15/986,401, filed May 22, 2018, and titled "Compositing Aware Digital Image Search," the entire disclosure of which is hereby incorporated by reference.

BACKGROUND

Digital image compositing is a fundamental task implemented by image processing systems of a computing device as part of digital image editing and graphic design. Digital image compositing involves combining foreground objects and background scenes from different sources to generate a new composite digital image. Conventional techniques used to perform digital image compositing, however, are both computationally inefficient and frustrating to users due to inefficiencies of user interaction supported by these conventional techniques. These inefficiencies and user frustrations are exacerbated by a multitude of diverse digital images that may act as sources for these objects and scenes, which may number in the millions.

Compatibility of a foreground object with a background scene, for instance, may be defined using a wide range of characteristics, the importance of which may differ based on content included in the digital images. In one such example, a viewpoint may have greater importance when inserting a foreground object of a car on a background scene of a road. On the other hand, semantic consistency may have greater importance when composing a skier with a snowy mountain. Conventional techniques, however, focus on a single characteristic or rely on manual extraction of features to define matching criteria. Thus, these conventional techniques are not capable of adapting to different characteristics and the differing relative importance of these characteristics in defining a match for different object categories as described above. Further, these conventional techniques may fail when confronted with "big data" as involved with addressing millions of digital images that may be available as compositing sources, an example of which is a stock digital image system accessible via a network.

SUMMARY

Compositing aware digital image search techniques and systems are described that leverage machine learning. In one example, a compositing aware image search system employs a two-stream convolutional neural network (CNN) to jointly learn feature embeddings from foreground digital images that capture a foreground object and background digital images that capture a background scene.

In order to train machine-learning models of the convolutional neural networks, triplets of training digital images are used. Each triplet includes a positive foreground digital image and a positive background digital image taken from the same digital image, e.g., through use of segmentation mask annotations. The triplet also contains a negative foreground or background digital image that is dissimilar to the positive foreground or background digital image that is also included as part of the triplet. In order to support a search of foreground objects, for instance, positive and negative foreground digital images along with a positive background digital image are used in training the model. In order to support a search of a background scene, on the other hand, positive and negative background digital images along with a positive foreground digital image are used in training the model. The triplets of training digital images are then processed by respective background and foreground convolutional neural networks (CNNs) jointly using a loss function (e.g., triplet loss) to learn a common embedding space. This common embedding space, one learned, is then usable by the system to define compatibility of the foreground and background digital images with each other.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
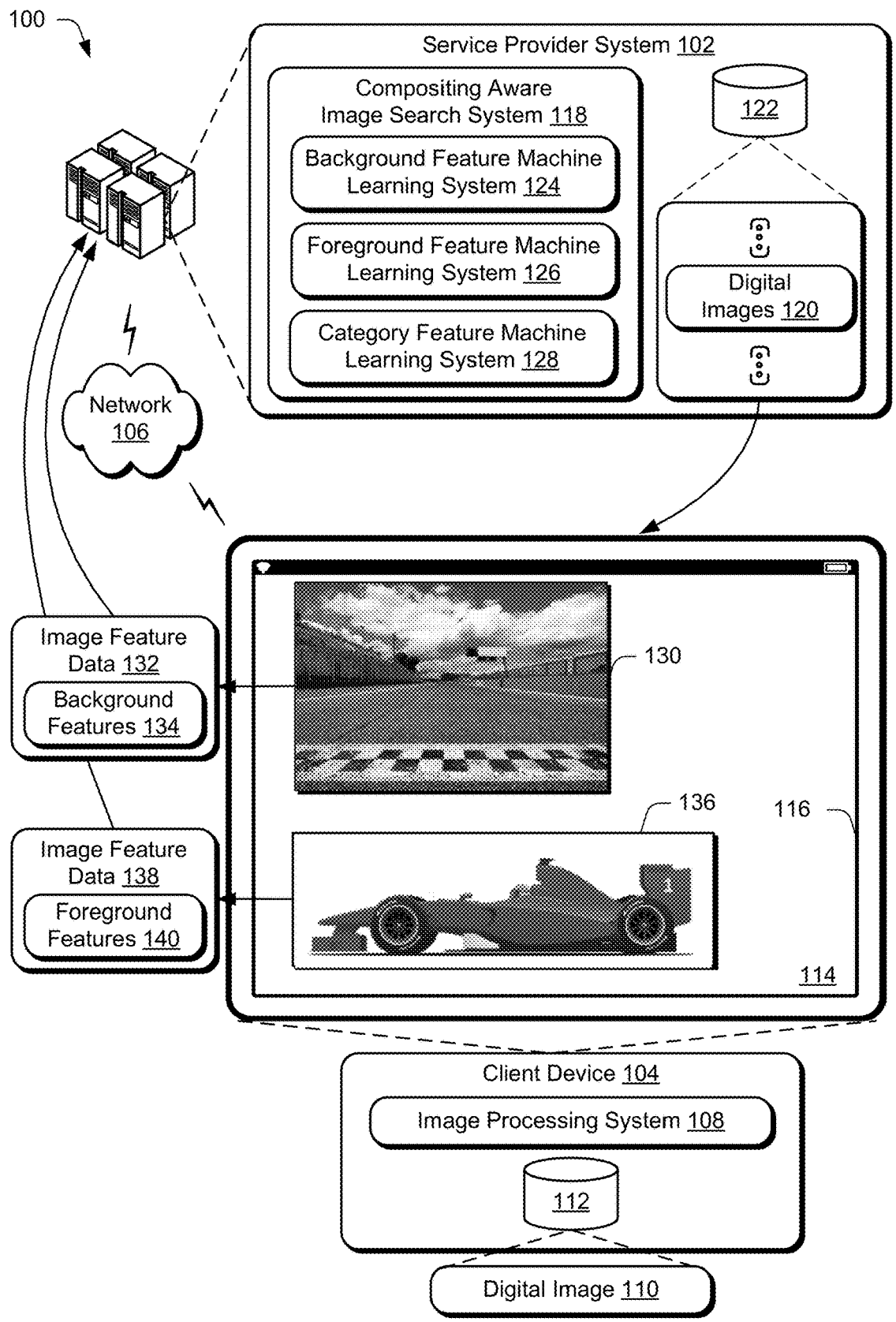
FIG. 1 is an illustration of an environment in an example implementation that is operable to employ compositing aware digital image search techniques described herein.

Conventional techniques used to composite digital images typically rely on manually extracted features and defined matching criteria or rely on a single characteristic of define when a foreground object is compatible with a background scene. Consequently, conventional techniques fail to address the vast variety of characteristics that may be used to define this compatibility, the importance of which may change for different categories of digital images, i.e., what is captured by the images.

Accordingly, compositing aware digital image search techniques and systems are described that leverage machine learning. Therefore, instead of manually designing matching criteria or hand engineering features, features representations may be learned automatically and accurately by a compositing aware image search system for background scenes and foreground objects using machine learning, e.g., through use of respective convolutional neural networks. For example, the compositing aware image search system may employ a two-stream convolutional neural network (CNN) to jointly learn feature embeddings from foreground digital images that capture a foreground object and background digital images that capture a background scene.

In order to train models of the convolutional neural networks, triplets of training digital images are used from a dataset having segmentation mask annotations to learn a common embedding space. Each triplet, for instance, may include a positive foreground digital image and a positive background digital image taken from the same digital image, e.g., through use of segmentation mask annotations. The triplet also contains a negative foreground or background digital image that is dissimilar to the positive foreground or background digital image that is also included as part of the triplet. In order to support a search of foreground objects, for instance, positive and negative foreground digital images along with a positive background digital image are used in training the model. In order to support a search of a background scene, on the other hand, positive and negative background digital images along with a positive foreground digital image are used in training the model. Similarity (positive compatibility) or dissimilarity (i.e., negative compatibility) may be based on characteristics usable to define compatibility of digital images with each other, such as semantics, viewpoint, style, color, and so on.

The triplets of training digital images are then processed by respective background and foreground convolutional neural networks (CNNs) jointly using a loss function (e.g., triplet loss) to learn a common embedding space, i.e., to train machine-learning models of the convolutional neural networks. This common embedding space, one learned, is then usable by the system to define compatibility of the foreground and background digital images with each other. This may be performed, for instance, by computing scores based on cosine similarity for feature vectors of the background features and foreground features learned by respective convolutional neural networks of this two-stream system. Categorical data may also be embedded as part of the background and foreground features to further guide compatibility, e.g., through use of categorical features learned from text of the categorical data using word2vec.

In this way, generation of the features from the backgrounds and foregrounds may be used to address a wide range of characteristics usable to define compatibility and thus overcome the limitations of conventional techniques. Further these techniques may be used to address millions of available digital images that may act as sources for the compositing. For example, the background features may be computed offline and then used in real time with foreground features that are also generated in real time to perform a compositing aware search, which is not possible using conventional manually defined techniques.

Techniques may also be employed by the compositing aware image search system to expand a number of training digital images that are available to train the background and foreground convolutional neural networks. A training data generation module, for instance, may be employed by the system to generate additional examples of positive or negative background or foreground digital images to be used for training. In one example, this is performed by replacing a positive foreground digital image associated with a positive background digital image with a similar positive foreground digital image taken from another digital image. In another example, this is performed by replacing a positive background digital image associated with a positive foreground digital image with a similar positive background digital image taken from another digital image. Similar techniques may also be employed to increase a number of negative training digital images, e.g., through replacement of positive foreground or background digital images with dissimilar foreground or background digital images. In this way, training accuracy as part of machine learning may be improved, even through use of a training data set having a limited number of annotated (e.g., masked) examples. Further discussion of these and other examples is included in the following sections and shown in corresponding figures.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ compositing aware digital image search techniques described herein. The illustrated environment 100 includes a service provider system 102 and a client device 104, which may be configured in a variety of ways. Computing devices that implement the service provider system 102 and the client device 104 may be configured in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized to implement the service provider system 102.

The client device 104 is illustrated as including an image processing system 108. The image processing system 108 is implemented at least partially in hardware of the client device 104 to process and transform a digital image 110, which is illustrated as maintained in a storage device 112 of the client device 104. Such processing includes creation of the digital image 110, modification of the digital image 110, and rendering of the digital image 110 in a user interface 114 for output, e.g., by a display device 116. Although illustrated as implemented locally at the computing device 102, functionality of the image processing system 104 may also be implemented as whole or part via functionality available via the network 114, such as part of a web service or "in the cloud."

An example of functionality incorporated by the image processing system 110 to process the digital image includes digital image compositing. Digital image compositing involves combining foreground objects and background scenes from different sources to generate a new composite digital image. A user, for instance, may wish to add a foreground object to a background scene or change a background scene for a foreground object.

To do so in the illustrated example, the image processing system 108 accesses a compositing aware image search system 118 of a service provider system 102 via the network 106. Other examples are also contemplated in which the compositing aware image search system 118 is implemented locally on the client device 104 that is used to perform the compositing. This access is used to perform a search of digital images 120 maintained in a storage device 122 that are compatible with the digital image 110 of the client device 104.

As previously described, compatibility of foreground and background images with each other may be defined using a variety of characteristics, the importance of which may change based on which categories, to which, the images belong. For example, a viewpoint may have greater importance when inserting a foreground object of a car on a background scene of a road whereas semantic consistency may have greater importance when composing a skier with a snowy mountain. Accordingly, the compositing aware image search system 118 includes a background feature machine learning system 124 and a foreground feature machine learning system 126 that are configured, respectively, to generate background and foreground features. The background are foreground features are usable to determine compatibility of a foreground image with a background image. In an implementation, this may also be aided through use of a category feature machine learning system 128 that is usable to learn category features from categorical data that is provided along with the foreground and background images. The categorical data, for instance, may define a category defining "what" is included in the foreground and background digital images and thus aide the search as further described below. In one example, this is performed for eight categories that frequently appear and are widely used in image compositing: 'person', 'car', 'boat', 'dog', 'plant', 'bottle', 'chair' and 'painting'.

In this way, a background digital image 130 may be used as a basis to generate image feature data 132 that includes background features 134 that are used to determine compatibility with digital images 120 of a foreground. Likewise, a foreground digital image 136 may be used to generate image feature data 138 having foreground features 140 that are used to determine compatibility with digital images of a background.

Through use of the background and foreground feature machine learning systems 124, 126, learned feature representations can encode rich information specifically for image compositing and can adapt to various image content. Additionally, the compositing aware image search system 118 may address multiple foreground and/or background categories in a single framework and thus promotes computational efficiency and operation of a computing device that employs these techniques. In this way, the compositing aware image search system 118 may address a variety of categories, even if not specifically trained for by the system, which is not possible using conventional manual or single category techniques.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Compositing Aware Digital Image Search System Architecture

Figure 2:
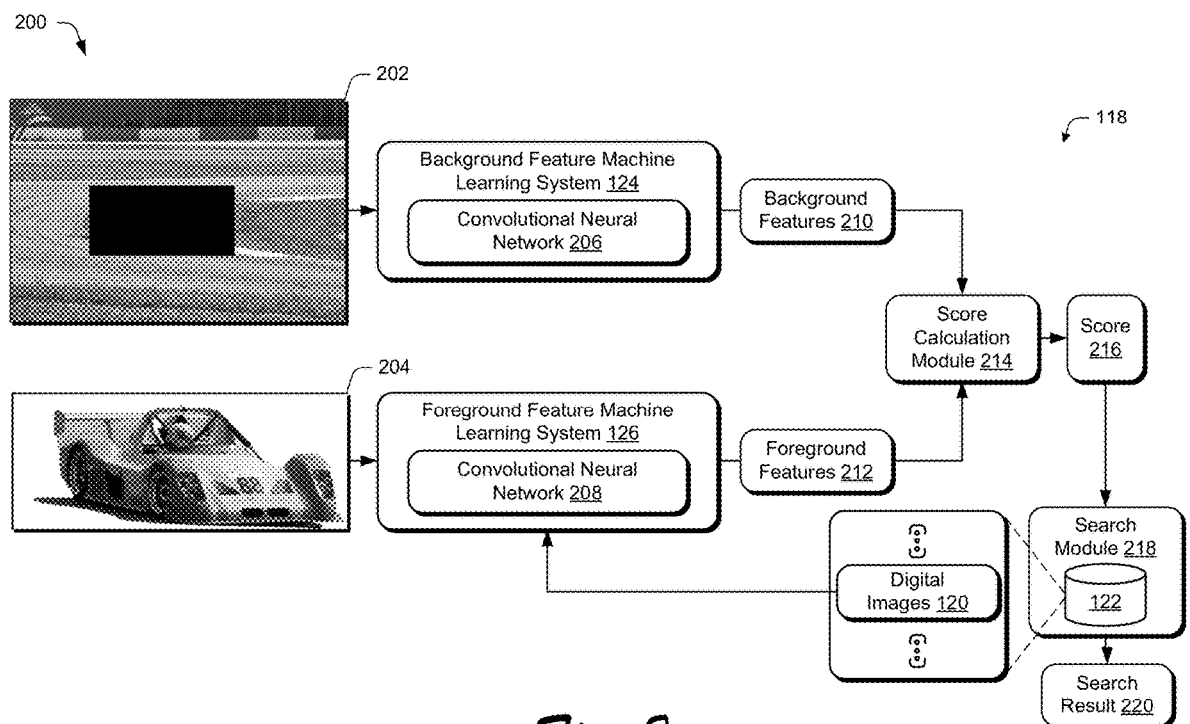
FIG. 2 depicts a system in an example implementation showing a two-stream system architecture of a compositing aware image search system of FIG. 1 in greater detail.
Figure 3:
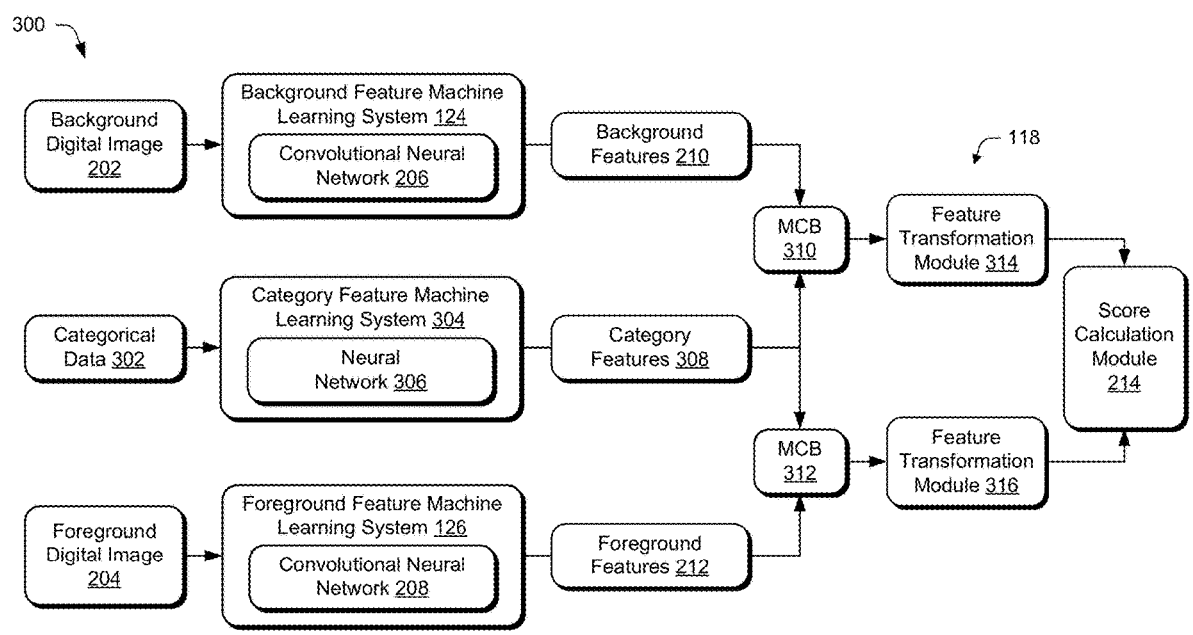
FIG. 3 depicts a system in an example implementation showing a two-stream system architecture of a compositing aware image search system of FIG. 2 in greater detail as incorporating categorical information.
Figure 4:
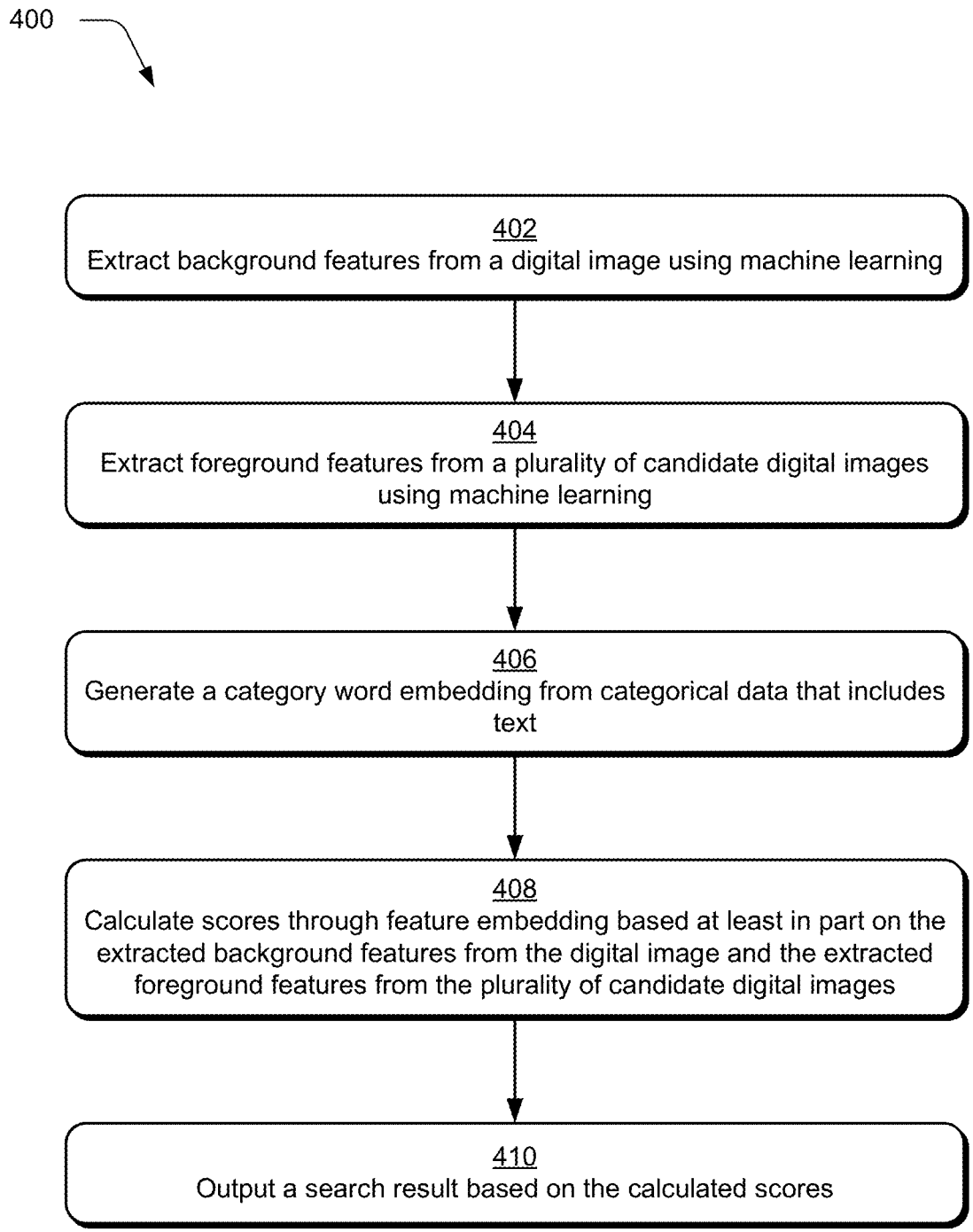
FIG. 4 is a flow diagram depicting a procedure in an example implementation which a search result is generated based on foreground features learned from a foreground image using machine learning and background features learned from a plurality of candidate digital images.
Figure 5:
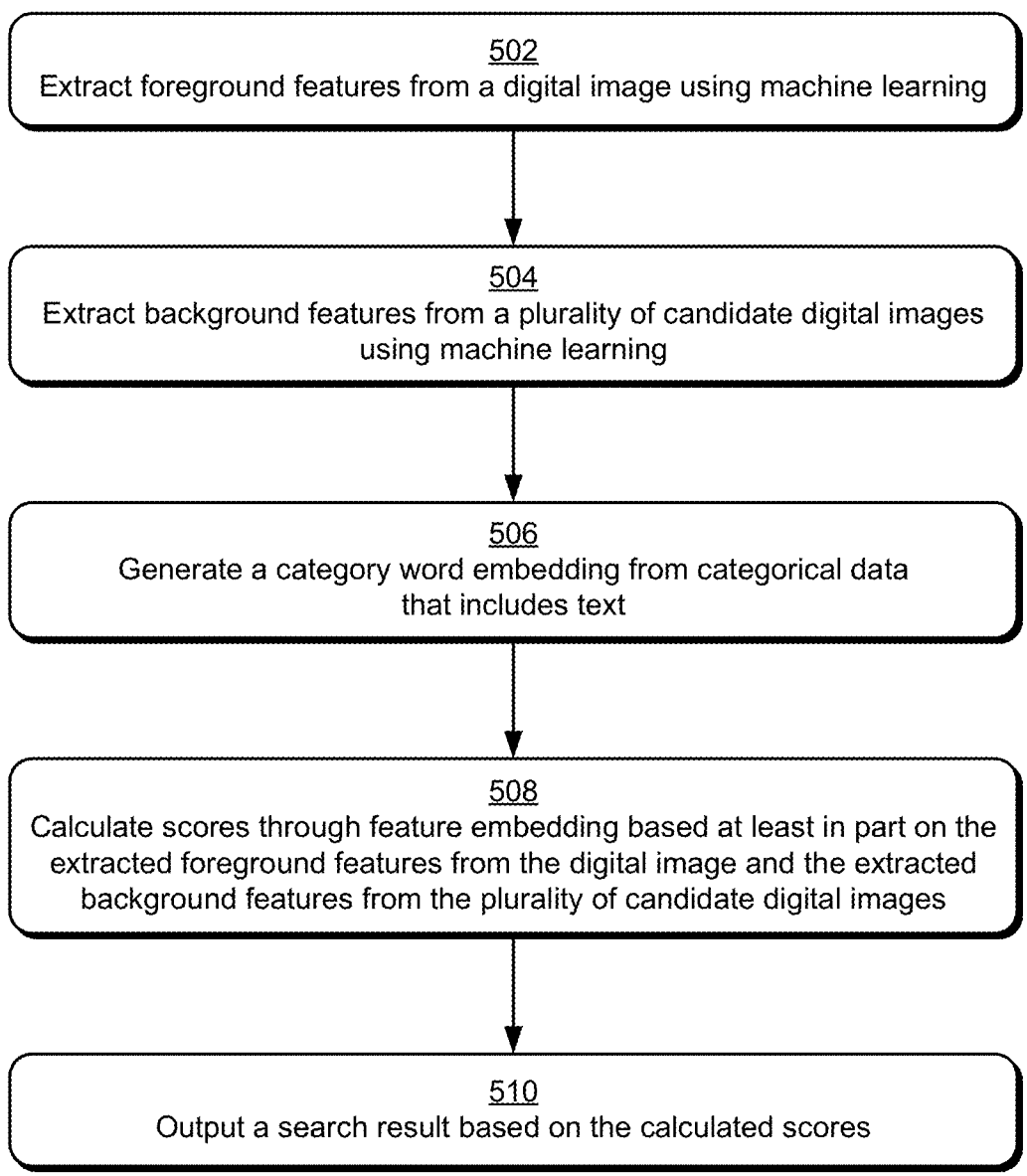
FIG. 5 is a flow diagram depicting a procedure in an example implementation which a search result is generated based on background features learned from a background digital image using machine learning and foreground features learned from a plurality of candidate digital images.

FIG. 2 depicts a system 200 in an example implementation showing a two-stream system architecture of a compositing aware image search system 118 of FIG. 1 in greater detail. FIG. 3 depicts a system 300 in an example implementation showing a two-stream system architecture of the compositing aware image search system 118 of FIG. 1 in greater detail as incorporating categorical information. FIG. 4 depicts a procedure 400 in an example implementation in which a search result is generated based on foreground features learned from a foreground image using machine learning and background features learned from a plurality of candidate digital images. FIG. 5 depicts a procedure 500 in an example implementation in which a search result is generated based on background features learned from a background digital image using machine learning and foreground features learned from a plurality of candidate digital images.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 1-4.

As shown in FIG. 2, the context aware image search system 118 is formed as a two-stream feature embedding network that is configured to determine compatibility of a background image 202 with a foreground ground image 204. A first stream is represented by the background feature machine learning system 124 and the second stream is represented by a foreground feature machine learning system 126. The background and foreground machine learning systems 124, 126 employ respective convolutional neural networks 206, 208 to learn background features 210 and foreground features 212, respectively.

Convolutional neural networks 206, 208 are formed for layers of nodes (i.e., neurons) and include an input layer, an output layer, and one or more hidden layers. The hidden layers may include convolutional layers, pooling layers, fully connected layers, and/or normalization layers. The convolutional neural networks 206, 208 are trained to learn a common embedding space that is then used to determine compatibility of the background image 202 with the foreground image 204, e.g., using cosine similarity. Further discussion of training of the models is included in a Compositing Aware Training Data Generation and Machine Learning section in the following discussion.

In the illustrated example, the background feature machine learning system 124 takes a background image 202 as an input. A portion of digital image 202 that is to receive a foreground object is filled by the system. To do so, the background feature machine learning system 124 calculates a color mean value of colors of the background image and uses this color mean value to fill a rectangle having a height and width of a foreground object that is to be composited with the background. In this way, the filled portion defines a size, aspect ratio, and location in the background scene that is to receive a foreground object.

The foreground feature machine learning system 126 accepts as an input a foreground digital image 204 to generate the foreground features 212. The foreground digital image 204 in this example includes a foreground object with a pure background, e.g., a white background. Examples of these foreground digital images may be obtained from stock image systems (e.g., Adobe® Stock) which are abundant and preferred by creative professionals while at the same time difficult to search using conventional techniques, e.g., keyword searches.

The background and foreground features 210, 212 are provided to a score calculation module 214 to calculate a score 216 that is indicative of compatibility of the background and foreground digital images. The score 216 is based on "how close" the background and foreground features 210, 212 are to each other in a common embedding space learned by the convolutional neural networks 208, 208, e.g., using cosine similarity. These scores are then used by a search module 218 to rank candidate digital images 120 in the storage device 122 to generate a search result 220 indicating compatibility of the digital images with each other. This may be performed to locate a foreground digital image 204 for a respective background digital image 202 or to locate a background digital images 202 for a foreground digital image 204.

FIG. 3 depicts an example system 300 in which the context aware image search system 118 of FIG. 2 is adapted to address categorical data 302. In this example, the context aware image search system 118 is configured to address multiple image categories in a single framework, which is not possible using conventional techniques. In this way, the context aware image search system 118 may address differences in importance of characteristics in determining compatibility of foreground and background digital images for a diverse range of categories, even if not specifically trained by the system.

To do so in the illustrated example, categorical data 302 is received by a category feature machine learning system 304 that is processed via a neural network 306 to generate category features 308. The neural network 306, for instance, may employ a word2vec technique, which is a group of related machine learning models that are used to generate the category features as word embeddings. These machine-learning models may be implemented as two-layer neural network that are trained to reconstruct linguistic contexts of words.

The neural network 306 is trained using a corpus of text to learn a vector space, typically of several hundred dimensions in which each unique word in the corpus is assigned a corresponding vector in the vector space. Therefore, word vectors are positioned in the vector space such that words that share common contexts in the corpus are located in close proximity to each other in the space. In this way, a diverse range of categorical data 302 may be employed to describe characteristics of the background and foreground digital images 202, 204. This may even be used address categorical data 302 that was not specifically trained by the context aware image search system 118 by determining proximity of the untrained words in the vector space to words that are used as part of training.

In order to incorporate the category features by the context aware image search system 118, the category features 308 are encoded as part of the background features 210 and the foreground features 212. To do so, multimodal compact bilinear pooling (MCB) modules 310 are used in the illustrated example to take an outer product of the two vectors (e.g., the background features 210 and the category features 308; or the foreground features 212 and the category features 308) to form the combination, although other techniques are also contemplated. Feature transformation modules 314, 316 are then employed to adopt both an inner product and compact bilinear pooling along with a light computation CNN to generate scores through use of a score calculation module 214 that employs a triplet loss function.

In an implementation example, a ResNet50 deep neural network is employed to learn the features, (e.g., up to a 'pool5' layer) as initial weights, after which global average pooling is performed to obtain a feature map of size "1×1× 2048." Although the background stream and foreground stream of the background feature machine learning system 124 and the foreground feature machine learning system 126 are initialized with the same weights from ResNet50, after learning these streams can encode different information. For example, the background feature machine learning system 124 may be configured to focus on a context of a background scene, whereas the foreground feature machine learning system 126 focuses on object-oriented features.

To learn the category features 308 as a category-specific feature mapping, the category feature machine learning system 304 employs a word2vec model as described above to extract a 300-dimension vector as the category features 308. After several convolutional layers, the category features 308 are then fused with the background and foreground features 210, 212 in each separate MCB modules 310, 312. Lightweight feature transformation modules 314, 316, including one convolution layer, an element-wise signed square root layer ($y=\text{sign}(x)\sqrt{|x|}$) and an instance-wise $\ell_2$ normalization operation, are further appended to the system. This is used to generate a unit feature vector for background and foreground respectively, which encodes both the category data 302 and image content from the background digital image 202 and foreground digital image 204.

This may be used to support a variety of usage scenarios. In a first example, a creative professional may interact with an image processing system 108 of a client device 104 having a background scene of a background digital image 130, and wish to locate a foreground object from a foreground digital image that is to be composited with the background scene.

Accordingly, the background digital image 202 is provided to the compositing aware image search system 118. A background feature machine learning system 124 is then employed to extract background features 210 from a digital image (e.g., the background digital image 202) using machine learning (block 402), e.g., by the convolutional neural network 206. This may be performed "online" in real time in seconds as the background digital image 202 is received.

The compositing aware image search system 118 also employs a foreground feature machine learning system 126 to extract foreground features 212 from a plurality of candidate digital images 120 using machine learning (block 404). The foreground feature machine learning system 126 in this instance may perform this extraction "offline" to extract the foreground features 212 from a repository of candidate digital images of foreground objects. The foreground features 212 may then be stored in a storage device to support real time search based on the background features 210 in this example, which is not possible using conventional techniques.

In the example system 300 of FIG. 3, the compositing aware image search system 118 is also configured as including a category feature machine learning system 304 to generate a category features from category data 302 that includes text (block 406). The categorical data 302, for instance, may provide a semantic context of characteristics of the background and foreground digital images that are to be used as a basis to determine compatibility. The category features 308, for instance, may be embedded as part of the background features 210 and foreground features 212 by respective MCB 310, 312 modules and processed with respective feature transformation modules 314, 316.

A score calculation module 214 is then implemented to calculate scores through feature embedding based at least in part on the extracted background features from the digital image and the extracted foreground features from the plurality of candidate digital images (block 408), which is then used to output a search result 220 based on the calculated scores (block 410). The scores 216 indicate a relative closeness of the background and foreground features to each other in a common embedding space. As such, the scores 216 are usable to define relative amounts of compatibility of the background image with each of the candidate digital images that are to act as a foreground image. These scores may then be used to rank the candidate digital images for output as part of the search result 220. Further, the use of online and offline feature generation may thus support receipt and generation of the search result 220 in real time, which is not possible using conventional techniques. These techniques may also be used to locate background scenes for a foreground object as further described in the following example.

FIG. 5 depicts a procedure 500 in an example implementation in which a search result is generated based on background features learned from a background digital image using machine learning and foreground features learned from a plurality of candidate digital images. In this example, a creative professional may be working with an image processing system 108 of a client device 104 with a foreground object of a foreground digital image 136 and wish to locate a compatible background scene of a background digital image that is to be composited with the foreground object. Accordingly, the foreground digital image 204 is provided to the compositing aware image search system 118.

A foreground feature machine learning system 126 is then employed to extract foreground features 212 from a digital image (e.g., the foreground digital image 204) using machine learning (block g02), e.g., by the convolutional neural network 208. This may be performed "online" in real time as the foreground digital image 204 is received.

The compositing aware image search system 118 also employs a background feature machine learning system 124 to extract background features 210 from a plurality of candidate digital images 120 using machine learning (block 504). The background feature machine learning system 124 in this instance may perform this extraction "offline" to extract the background features 210 from a repository of candidate digital images 120 of background scenes. The background features 210 may then be stored in a storage device to support real time search based on the foreground features 212 in this example, which is not possible using conventional techniques.

In the example system 300 of FIG. 3, the compositing aware image search system 118 is also configured as including a category feature machine learning system 304 to generate a category features from category data 302 that includes text (block 506). The categorical data 302, for instance, may provide a semantic context of characteristics of the background and foreground digital images that are to be used as a basis to determine compatibility. The category features 308, for instance, may be embedded as part of the background features 210 and foreground features 212 by respective MCB 310, 312 modules and processed with respective feature transformation modules 314, 316.

A score calculation module 214 is then also implemented to calculate scores through feature embedding based at least in part on the extracted background features from the digital image and the extracted foreground features from the plurality of candidate digital images (block 508), which is then used to output a search result 220 based on the calculated scores (block 510). The scores 216 indicate a relative closeness of the background and foreground features to each other in a common embedding space and are thus usable to define relative amounts of compatibility of the foreground image with each of the candidate digital images that are to act as a background image. These scores may then be used to rank the candidate digital images for output as part of the search result. Further, the user of online and offline feature generation may thus support receipt and generation of the search result 220 in real time as above, which is not possible using conventional techniques.

Accordingly, compositing aware digital image search techniques and systems are described that overcome the challenges of conventional techniques. Therefore, instead of manually designing matching criteria or hand engineering features, features representations may be learned automatically and accurately by a compositing aware image search system 118 for background scenes and foreground objects using machine learning, e.g., through use of respective convolutional neural networks. Training of the compositing aware image search system 118 is described in the following section and shown in corresponding figures.

Compositing Aware Training Data Generation and Machine Learning

Figure 6:
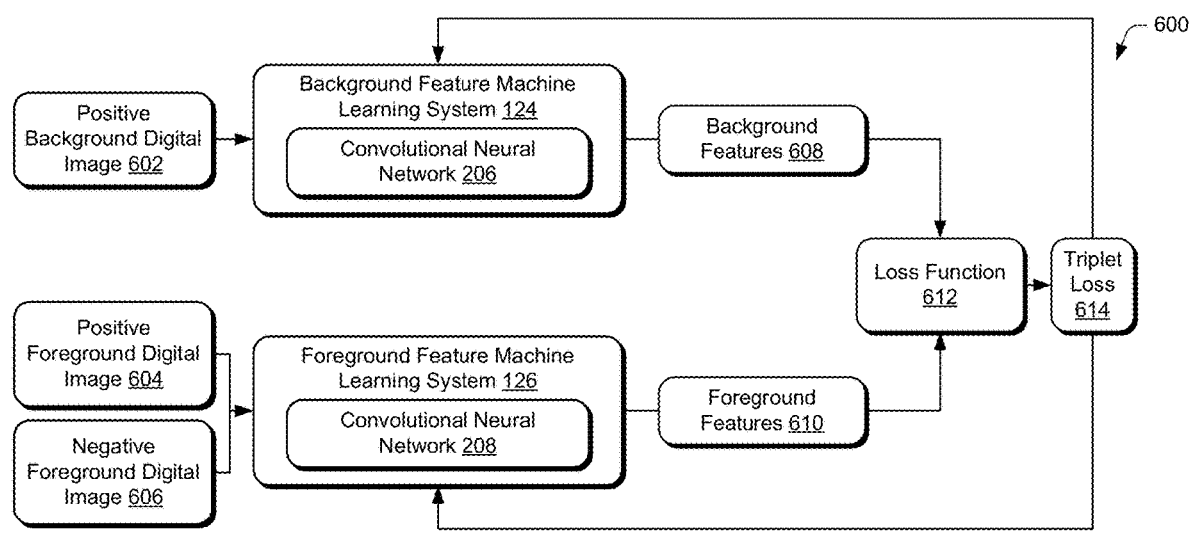
FIG. 6 depicts a system in an example implementation showing training of a two-stream system architecture of the compositing aware image search system 118 of FIG. 1 in greater detail.
Figure 7:
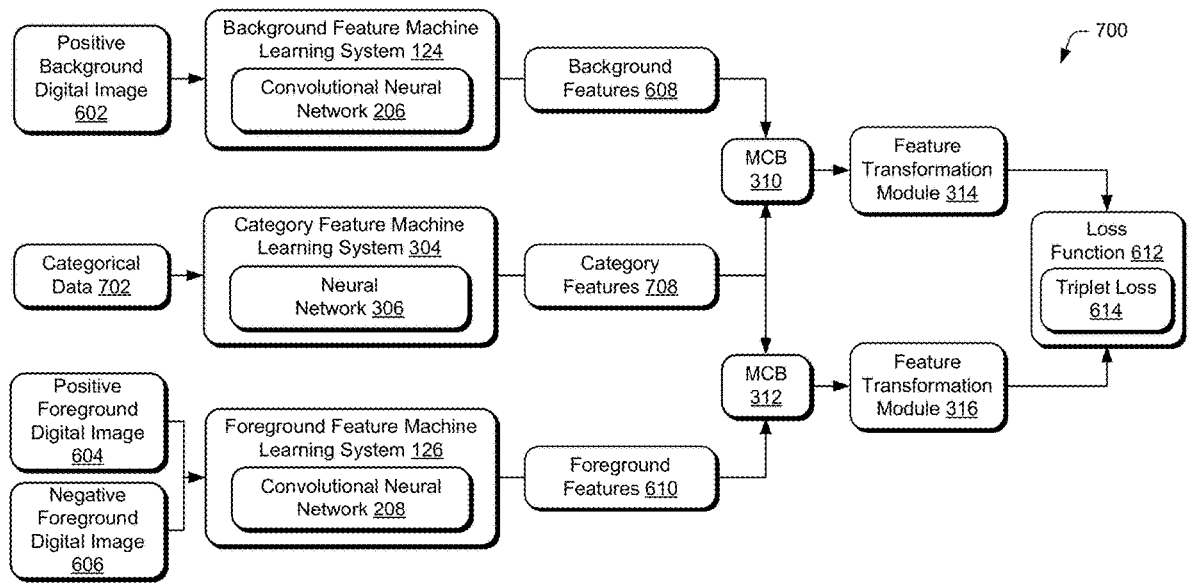
FIG. 7 depicts a system in an example implementation showing a two-stream system architecture of the compositing aware image search system of FIG. 1 in greater detail as incorporating categorical data.
Figure 8:
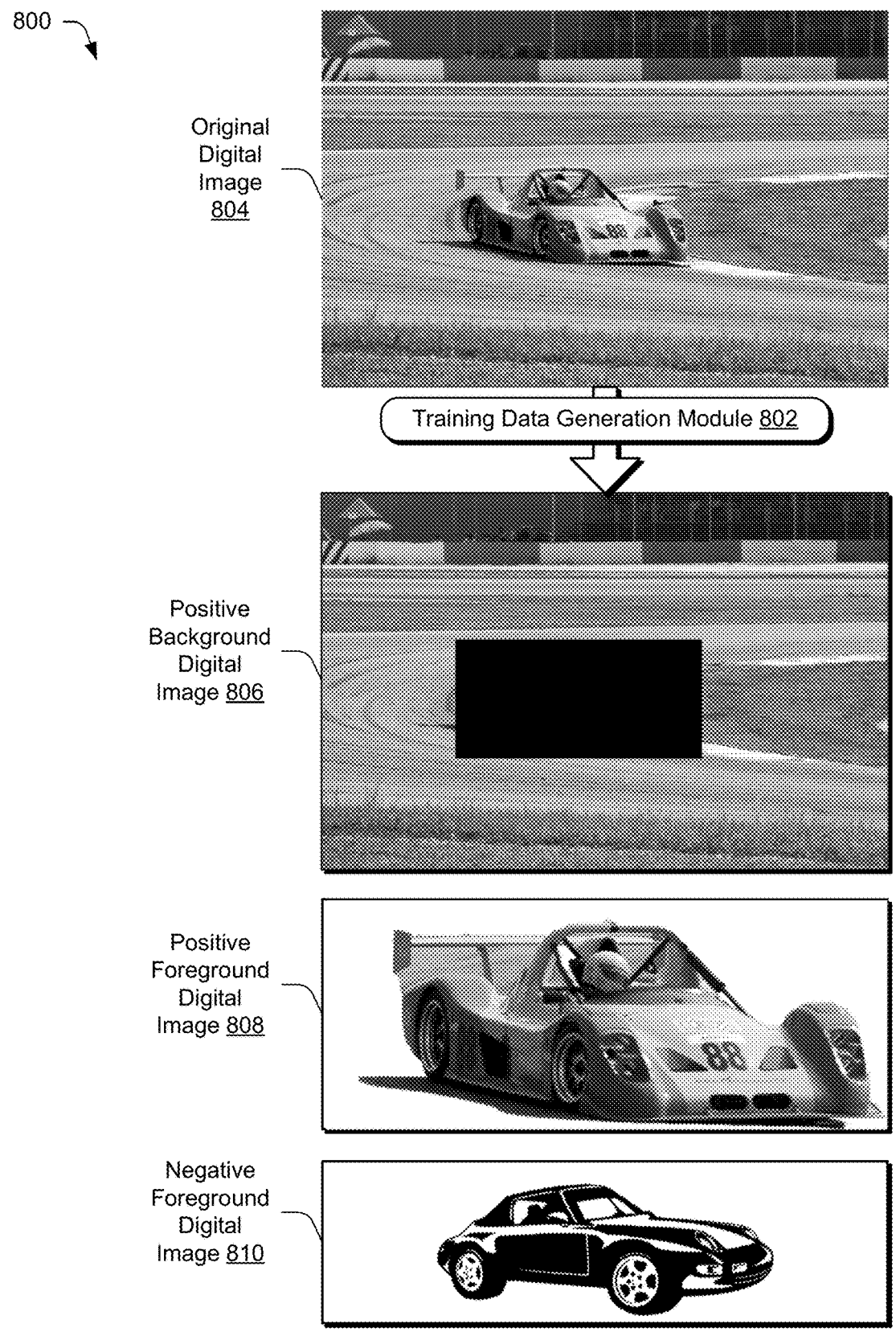
FIG. 8 depicts an example of training digital images generated for use in training the compositing aware image search system.
Figure 9:
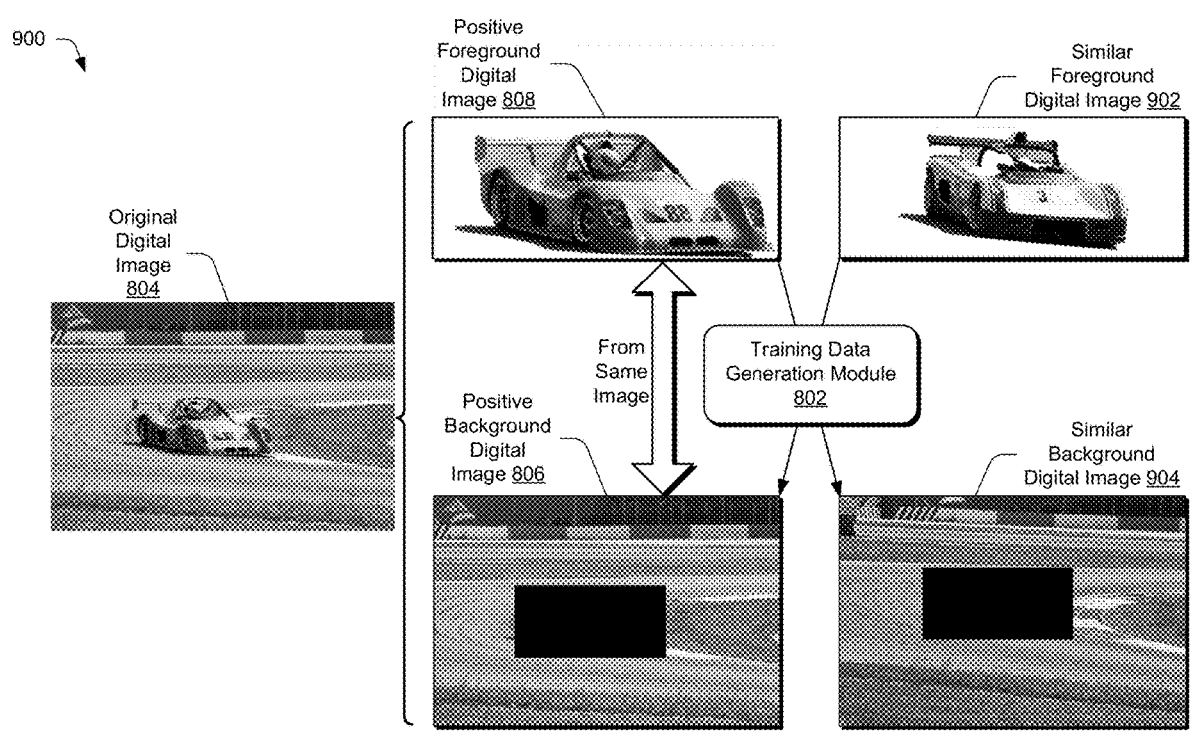
FIG. 9 depicts an example implementation in which additional positive training digital images are generated by the compositing aware image search system 118 of FIG. 1.
Figure 10:
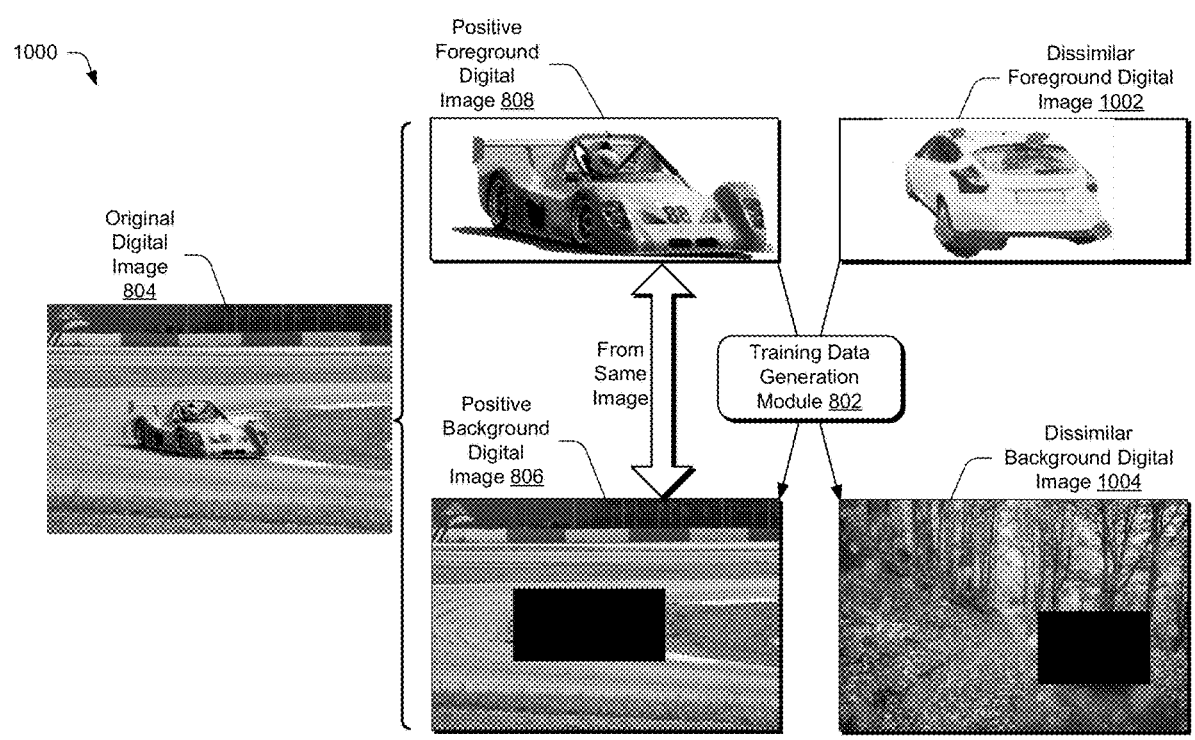
FIG. 10 depicts an example implementation in which additional negative training digital images are generated by the compositing aware image search system of FIG. 1.
Figure 11:
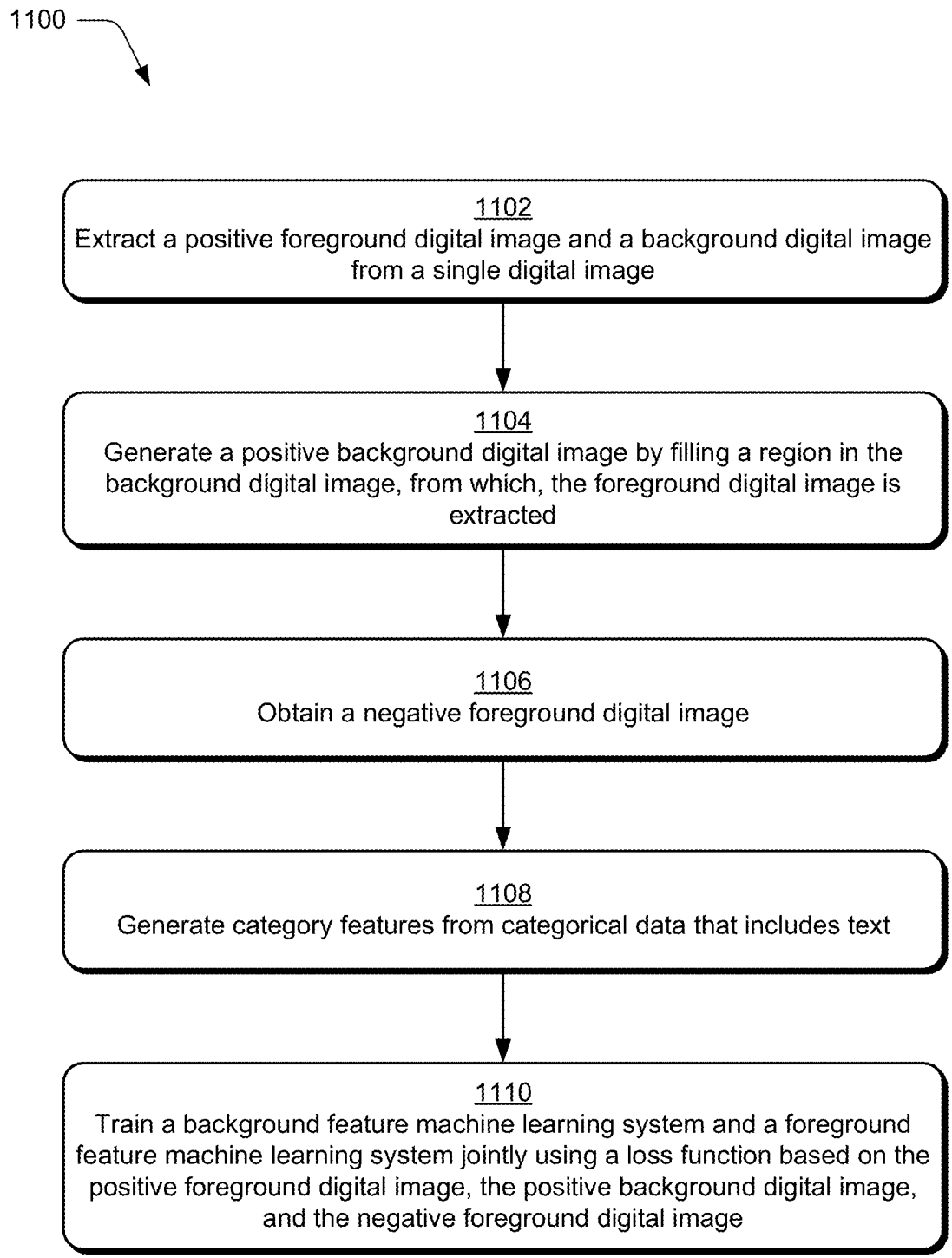
FIG. 11 depicts a procedure in an example implementation in which training digital images are generated for use in digital image compositing.

FIG. 6 depicts a system 600 in an example implementation showing training of a two-stream system architecture of the compositing aware image search system 118 of FIG. 1 in greater detail. FIG. 7 depicts a system 700 in an example implementation showing a two-stream system architecture of the compositing aware image search system 118 of FIG. 1 in greater detail as incorporating categorical data. FIG. 8 depicts an example 800 of training digital images generated for use in training the compositing aware image search system 118. FIG. 9 depicts an example implementation 900 in which additional positive training digital images are generated by the compositing aware image search system 118 of FIG. 1. FIG. 10 depicts an example implementation 1000 in which additional negative training digital images are generated by the compositing aware image search system 118 of FIG. 1. FIG. 11 depicts a procedure 1100 in an example implementation in which training digital images are generated for use in digital image compositing.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 6-11.

Triplets of training digital images are used to train the background feature machine learning system 124 and foreground feature machine learning system 126. In the illustrated example 600 of FIG. 6, this is performed using a positive background digital image 602, a positive foreground digital image 604, and a negative foreground digital image 606. As before, this is used to generate respective background and foreground features 608, 610 and from this a loss function 612 is used to generate a triplet loss 614 to train the background and foreground feature machine learning systems 124, 126.

Categorical data 702 may also be employed as part of this training as shown in the system 700 of FIG. 7. In this example, categorical data 702 is processed as training data by a neural network 306 of the category feature machine learning system 304 to generate category features 708, e.g., vector representations of text using word2vec. The category features 708 are embedded as part of the background and foreground features 608, 610 using MCB 310, 312 modules and processed using feature transformation modules 314, 316 as previously described. A loss function 612 is again used to calculate a triplet loss to train the background and foreground feature machine learning systems 124, 126.

Accuracy in training the background and foreground feature machine learning systems 124, 126 for image compositing may be increased by increasing a number of training digital images used as part of the training. A set of training digital images, however, are not available from conventional systems to support compositing aware image search. Collecting such a training set using conventional techniques is resource intensive, as it is time-consuming to manually label many pairs of background and foreground digital images, and also requires expertise in image compositing and digital image editing to decide if the two are compatible.

Accordingly, in this example the compositing aware image search system 118 is configured to generate training digital images automatically and without user intervention. To do so, digital images are obtained from a publicly available dataset that contain object instance segmentation masks, examples of which include MS-COCO, PASCAL VOC2012, and ADE20K. Utilizing these mask annotations, a training data generation module 802 decomposes each of the digital images into background scenes and foreground objects. An example of this is illustrated in FIG. 8 in which an original digital image 804 is used to generate a positive background digital image 806 and a positive foreground digital image 808. Because the positive background and foreground digital images 806, 808 are generated from the same original digital image 804, these images are compatible for compositing and generally more suitable than any other possible candidate pairs.

Therefore, to form a triplet of training digital images, the positive background digital image 806 is treated as an anchor and the positive foreground digital image 808 as the positive sample. A foreground object is randomly sampled from any other image as the negative sample, which is illustrated as a negative foreground digital image 810. Categorical data may also be used as part of this training. In one example, this is performed for eight categories that frequently appear and are widely used in image compositing: 'person', 'car', 'boat', 'dog', 'plant', 'bottle', 'chair' and 'painting'.

In practice, a foreground object is typically not included in a background digital image that is to be used as a basis to locate a foreground object in a foreground digital image. To mimic this situation in training, a portion 812 from which the foreground object is taken from the original digital image 804 is filled to remove the foreground object from the background scene. The portion 812 is filled in one example using a color calculated as a color mean of colors of the background digital image, from which, the foreground digital image is extracted.

By including the filled portion 812 in the positive background digital image 806, the learned background features 608 may respond to a location, size and/or aspect ratio of the foreground object to be inserted as part of determining compatibility of the foreground and background digital images. For example, when inserting a person on a lawn, a tall rectangle implies the user may want a standing person, while a wide rectangle may indicate a sitting person. Due to possible limitations in user accuracy, this constraint is not strictly enforced.

To address these limitations, the training data generation module 802 may implement a data augmentation process that relaxes size and scale constraints between paired foreground and background digital images to a defined extent. For background augmentation, a random padding is added to the bounding box with a maximum possible padding space set as half of the bounding box's width and height. The padded region is filled with the mean color value as well. Similarly for foreground augmentation, a random padding is added to fill in the padded region, e.g., with a white color. For the negative foreground digital image in the triplet, it is randomly chosen from another image with a similar augmentation technique. Although some foreground objects may be chosen that are actually compatible with the background, the foreground from the same image still has a greater degree compatibility and thus the distinction between positive and negative examples still holds true.

Although paired positive foregrounds and backgrounds from the same images may be generated quickly and efficiently by the training data generation module 802, the number of positive samples is significantly less than that of negative samples (e.g., "m" versus "m(m−1)") for an "m" number of available digital images. The severe imbalance in the number of training samples, coupled with the noise in negative pair sampling where some compatible foregrounds are mistreated as negative samples thus presents a challenge. To address this, a triplet extension strategy may be employed by the training data generation module 802 to generate additional positive samples, and may also be performed to generate additional negative samples.

FIG. 9, for instance, depicts generation of the positive foreground digital image 808 and the positive background digital image 806 from the original digital image 804 as described above. The training data generation module 802 then employs matching criteria to find similar foreground and/or background digital images 902, 904. Examples of matching criteria include semantic context and shape information. For the shape information, an intersection is calculated over a union (IoU) score of two foreground masks after alignment based on a mask center. Foregrounds with higher IoU scores are considered to have greater similarity in this example.

For semantic context information, the foreground digital images are filled using the original background digital image and semantic features are extracted using machine learning by a neural network (e.g., using ResNet50) trained for image classification. Similar foreground digital images 902 are then retrieved by comparing Euclidean "$\ell_2$" distances of the extracted features in a common embedding space. This technique yields results with increased consistency over other techniques that rely on feature extraction with a "pure" background, e.g., of white pixels.

In practice, foreground objects that have rigid shapes exhibit increased sensitivity to viewpoints used to view the objects. Therefore, shape information has increased effectiveness in finding similar foreground digital images. Additionally, foreground objects having a more diverse appearance may vary according to different scenes and therefore semantic context information has increased effectiveness in finding similar foreground digital images. Accordingly, shape information is used to locate positive foreground images for 'bottle', 'car', 'chair' and 'painting' in the above example and semantic context information is used to locate similar foreground images for 'boat', 'dog', 'person' and 'plant'.

Therefore, given a positive foreground digital image 808 and its corresponding positive background digital images 806 from the same original digital image 804, the top "N" similar foreground digital images 902 are located from the digital images 120 by the training data generation module 802. These similar foreground digital images 902 are treated as compatible foregrounds for the positive background digital image 806, e.g., as new triplets of training digital images. In this way, the number of positive training pairs may be increased and also reduce noise in negative pair sampling. This may also be used to replace the positive background digital image 806 with a similar background digital image 904 that when combined with the positive foreground digital image 808 also acts to increase a number of triplets of training digital images.

FIG. 10 depicts an example implementation 1000 in which additional negative training digital images are generated by the compositing aware image search system 118 of FIG. 1. The training data generation module 802 in this example generates additional negative samples that are to be used as part of a triplet of training digital images. To do so, the training data generation module 802 locates dissimilar foreground or background digital images 1002, 1004 based on criteria as described above. These criteria may include use of shape information or feature extraction by comparing the Euclidean distance (i.e., "$\ell_2$" distance) of the extracted features in a common embedding space.

Reference will not be made to FIG. 10, in which a positive foreground digital image 808 and a background digital image are extracted from a single digital image (block 1102). An original digital image 804, for instance, may including mask data that labels individual pixels of the digital image. This labeling may then be used to extract the foreground object as a foreground digital image as separated from a background scene of a background digital image.

A positive background image 806 is then generated by filling a region 812 in the background digital image, from which, the foreground digital image 808 is extracted (block 1104). The region 812, for instance, may be filled using a color calculated as a color mean of color values of pixels in the positive background digital image 806 that lie "outside" the region 812. The region 812 thus provides a size, shape, and location that is usable to guide a search for a foreground digital image.

A negative foreground digital image (block 1106) is also obtained. To do so, a training data generation module 802 randomly samples a foreground object from a digital image 120 repository as the negative sample, which is illustrated as a negative foreground digital image 810.

Category features may also be generated from categorical data that includes text (block 1108). The category features are used to guide the search by learning a vector representation of text using a neural network, such as word2vec. In one example, this is performed for eight categories that frequently appear and are widely used in image compositing: 'person', 'car', 'boat', 'dog', 'plant', 'bottle', 'chair' and 'painting'. In this way, the category data may be used to "guide" the search.

A background feature machine learning system 124 and a foreground feature machine learning system 126 are trained jointly using a loss function based on the positive foreground digital image 808, the positive background digital image 806, and the negative foreground digital image 810 (block 1110). This may also include training using the category features as embedded as part of background and foreground features extracted from the images.

Thus, the train the machine learning models of the convolutional neural networks 206, 208 of the background and foreground feature machine learning systems 124, 126, training data is employed that is configured as triplets of digital image. The triplets are constructed to include positive and negative samples of an image type being searched (e.g., foreground or background) and a positive example of the alternative image type not being searched. For a foreground search, for instance, the triplet includes a background image as an anchor, a compatible foreground as the positive sample, and a incompatible foreground as the negative sample. On the other hand, for a background search, the triplet includes a foreground image as an anchor, a compatible background as the positive sample, and a incompatible background as the negative sample.

A triplet loss is employed to train the neural networks and enforce the feature similarity, e.g., between background anchor and positive foreground to be closer to the one between anchor and negative sample. Because the feature vectors have a matching unit length after Euclidean "$\ell_2$" normalization, similarity to each other may be computed as a squared Euclidean "$\ell_2$" distance. To encourage an ability to distinguish between positive and negative sample pairs, a positive margin "$\alpha_i$" is introduced for class "i." For convenience, feature extraction, multimodal compact bilinear pooling and "$\ell_2$" normalization may be grouped into an operation representation "$\mathcal{F}$" as follows:

$$\|\mathcal{F}_i^b(B_i) - \mathcal{F}_i^f(F_i^p)\|_2^2 + \alpha_i \|\mathcal{F}_i^b(B_i) - \mathcal{F}_i^f(F_i^n)\|_2^2$$

where "$\mathcal{F}_i^b$" and "$\mathcal{F}_i^f$" are operations of category "i" in background and foreground streams, separately. The values "$B_i$" and "$F_i^p$," "$F_i^n$" represent the background digital image and its related positive (i.e., compatible) and negative foreground objects. In training, the following loss function "$\mathcal{L}$" is minimized:

$$\mathcal{L}(B_i, F_i^p, F_i^n) = \max(0, \|\mathcal{F}_i^b(B_i) - \mathcal{F}_i^f(F_i^p)\|_2^2 + \alpha_i - \|\mathcal{F}_i^f(F_i^f(F_i^n))\|_2^2)$$

This design has exhibited increased effectiveness over features sharing across multiple categories, which is not capable of encoding sufficient category-specific information.

These techniques also exhibit increased computational efficiency over learning separate feature representations dedicated for each category independently. Offline and online feature extraction techniques as described above may also support operation in real time (e.g., in a manner of seconds) for millions of digital images and thus supports increased richness in user interaction and efficiency in operation of a computing device that implements these techniques.

Example System and Device

Figure 12:
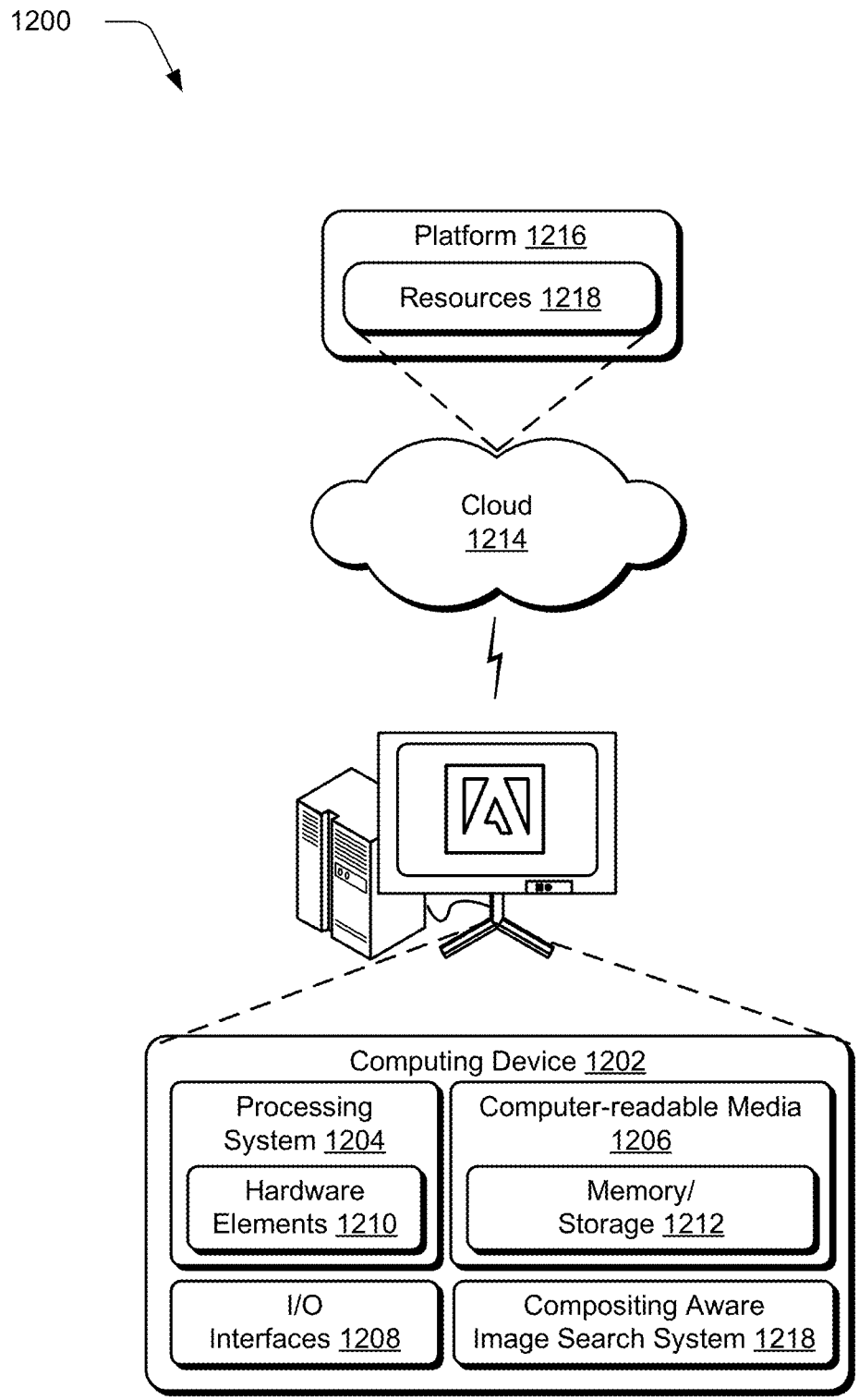
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the compositing aware image search system 118. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium compositing aware digital image search environment, a method implemented by at least one computing device, the method comprising:
   receiving, by the at least one computing device, foreground features extracted from a foreground of a digital image using machine learning;
   searching, by the at least one computing device, a plurality of candidate digital images based on:
      background features extracted from backgrounds of the plurality of candidate digital images, respectively, using machine learning; and
      the foreground features from the foreground of the digital image;
   generating, by the at least one computing device, a search result including at least one of the plurality of candidate digital images based on the searching; and
   outputting, by the at least one computing device, the search result.

2. The method as described in claim 1, wherein the background features and the foreground features are extracted using a two-stream neural network.

3. The method as described in claim 1, wherein the searching includes calculating scores through feature embedding based on the foreground features from the digital image and the background features from the plurality of candidate digital images and selecting the at least one of the plurality of candidate digital images based on the scores.

4. The method as described in claim 3, wherein the generating of the search result is based on category features generated from categorical data that includes text, the text describing the digital image.

5. The method as described in claim 4, wherein the category features are a vector representation of the text formed using machine learning.

6. The method as described in claim 4, wherein the category features are embedded into the background features and the foreground features and used to calculate the scores.

7. The method as described in claim 6, wherein the embedding is performed using respective multimodal compact bilinear pooling (MCB) modules.

8. In a digital medium compositing aware digital image search environment, a method implemented by at least one computing device, the method comprising:
   receiving, by the at least one computing device, background features extracted from a background of a digital image using machine learning;
   searching, by the at least one computing device, a plurality of candidate digital images based on:
      foreground features extracted from foregrounds of the plurality of candidate digital images, respectively, using machine learning; and
      the background features from the background of the digital image;
   generating, by the at least one computing device, a search result including at least one of the plurality of candidate digital images based on the searching; and
   outputting, by the at least one computing device, the search result.

9. The method as described in claim 8, wherein the background features and the foreground features are extracted using a two-stream neural network.

10. The method as described in claim 8, wherein the searching includes calculating scores through feature embedding based on the background features from the digital image and the foreground features from the plurality of candidate digital images and selecting the at least one of the plurality of candidate digital images based on the scores.

11. The method as described in claim 10, wherein the generating of the search result is based on category features generated from categorical data that includes text, the text describing the digital image.

12. The method as described in claim 11, wherein the category features are a vector representation of the text formed using machine learning.

13. The method as described in claim 11, wherein the category features are embedded into the background features and the foreground features and used to calculate the scores.

14. The method as described in claim 13, wherein the embedding is performed using respective multimodal compact bilinear pooling (MCB) modules.

15. In a digital medium compositing aware digital image search environment, a method implemented by at least one computing device, the method comprising:
 displaying, by the at least one computing device, a foreground of a digital image in a user interface;
 initiating, by the at least one computing device, a search of a plurality of candidate digital images responsive to a user input received via the user interface, the search based on:
  background features extracted from backgrounds of the plurality of candidate digital images, respectively, using machine learning; and
  foreground features extracted from the foreground of the digital image; and
 displaying, by the at least one computing device, a search result in the user interface including at least one of the plurality of candidate digital images based on the search.

16. The method as described in claim 15, wherein the background features and the foreground features are extracted using a two-stream neural network.

17. The method as described in claim 15, wherein the search is based on score calculated through feature embedding based on the background features from the digital image and the foreground features from the plurality of candidate digital images and selecting the at least one of the plurality of candidate digital images based on the scores.

18. The method as described in claim 17, wherein the search result is based on category features generated from categorical data that includes text, the text describing the digital image.

19. The method as described in claim 18, wherein the category features are a vector representation of the text formed using machine learning.

20. The method as described in claim 18, wherein the category features are embedded into the background features and the foreground features and used to calculate the scores.

* * * * *